US 6,473,251 B2

(12) United States Patent
Patti et al.

(10) Patent No.: US 6,473,251 B2
(45) Date of Patent: Oct. 29, 2002

(54) APPARATUS AND METHOD FOR REDUCING THERMAL INTERFERENCE IN MR HEADS IN DISK DRIVES

(75) Inventors: Giuseppe Patti, San Jose, CA (US); Gilles Denoyer, Campbell, CA (US); Roberto Alini, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/398,609

(22) Filed: Sep. 17, 1999

(65) Prior Publication Data

US 2002/0075584 A1 Jun. 20, 2002

Related U.S. Application Data

(63) Continuation-in-part of application No. 09/197,122, filed on Nov. 20, 1998, now Pat. No. 6,359,743.

(51) Int. Cl.[7] ................................................. G11B 5/02
(52) U.S. Cl. ............................... 360/25; 360/65; 360/46
(58) Field of Search .............................. 360/25, 65, 46, 360/53, 67; 327/553, 559, 554, 555

(56) References Cited

U.S. PATENT DOCUMENTS

| | | |
|---|---|---|
| 5,818,656 A | 10/1998 | Klaassen et al. |
| 5,834,969 A | 11/1998 | Umeyama et al. |
| 5,898,532 A | 4/1999 | Du et al. |
| 5,995,313 A * | 11/1999 | Dakroub .................... 360/67 |
| 6,359,743 B1 * | 3/2002 | Patti et al. .................... 360/25 |

OTHER PUBLICATIONS

Klaassen, K.B. and van Peppen, J.C.L. "Electronic Abatement of Thermal Interference in (G)MR Head Output Signals," IEEE Transactions on Magnetics, vol. 33, No. 5, Sep. 1997, pp. 2611–2616.

* cited by examiner

*Primary Examiner*—Alan T. Faber
(74) *Attorney, Agent, or Firm*—Lisa K. Jorgenson

(57) ABSTRACT

An apparatus (and method) is provided that reduces thermal interference in the read signal of a disk drive. A variable or programmable resistance is used to change the transfer function of a filter in the read channel of the disk drive to filter the read signal. The filter has a first transfer function (first cut-off frequency) related to the programmed resistance during normal operation of the disk drive (i.e. when thermal interference is not detected). When thermal interference is detected in the read signal, the resistance is programmed to another value resulting in the filter having a second transfer function (second cut-off frequency). The resistance element includes a transconductance amplifier whose transconductance is variable or programmable to different values resulting in different programmable transfer functions (or one of a multitude of cut-off frequencies) for the filter. In the preferred embodiment, detection of thermal interference increases the cut-off frequency of the filter thereby filtering, or reducing the effects of, the thermal interference in the read signal.

32 Claims, 5 Drawing Sheets

APPARATUS AND METHOD FOR REDUCING THERMAL INTERFERENCE IN MR HEADS IN DISK DRIVES

CROSS-REFERENCE TO RELATED APPLICATION(S)

This application is a continuation-in-part of Application Ser. No. 09/197,122 filed Nov. 20, 1998, now U.S. Pat. No. 6,359,743.

TECHNICAL FIELD

The present invention relates to disk drives and, in particular, to an apparatus and method for reducing thermal interference (thermal asperity) in magneto-resistive heads in disk drives.

BACKGROUND

Magneto-resistive and giant (G) magneto-resistive (collectively, MR) heads used in hard disk drive applications utilize a resistive sensing element to read magneticly stored data from a storage disk. The MR heads are thermally sensitive and the resistance of a MR head changes with temperature. The resistance of a typical MR head is given by the equation $R=R_0(1+\beta(T-298))$, where $R_o$ equals about 50 ohms, $\beta$ is the thermal coefficient of the head, and T is temperature in Kelvin. Accordingly, any variations in temperature increase/decrease the resistance of the MR head and affect the readback signal generated by the MR head as it reads data from the disk.

During operation of a disk drive, thermal interference occurs. A thermal interference event is also referred to as a thermal asperity. For additional description and discussion of thermal interference or thermal asperities, reference is made to a published article entitled "Electronic Abatement of Thermal Interference in (G)MR Head Output Signals", *IEEE Transactions on Magnetics*, Vol. 33, No. 5, September 1997 by Klaassen, et al., and is incorporated herein by reference. One solution proposed therein is to increase the low-frequency cutoff of a high pass filter, by switching in a resistor to lower the effective resistance of the RC high-pass filter—thereby increasing the cutoff frequency, when a thermal asperity is detected (the high pass filter is typically used to filter out low frequency signals in the read signal from the MR head). A significant problem with this solution is caused by the switching out of the resistor after the thermal asperity event has subsided to a certain level. This creates ringing and an unwanted offset in the read signal which may cause the loss of data. In addition, there is no control over the value of the resistor (or accuracy of the resistance value) that is switched into the circuit to lower the effective resistance of the high pass filter.

Accordingly, there exists a need for a thermal asperity recovery circuit and method that eliminates or reduces ringing and any unwanted offset in the read signal of a disk drive. In addition, there is a need for an apparatus and method that uses a programmable or variable cutoff frequency in a high pass filter used in thermal asperity recovery.

SUMMARY OF THE INVENTION

According to the present invention, there is provided a thermal event recovery circuit for filtering a read signal from a read head in a disk drive. The circuit includes a detection circuit for detecting a thermal event that affects the read signal and a filter. The filter includes a transconductance amplifier having a transconductance that varies in response to a control input. The transconductance is equal to a first predetermined transconductance in response to a first control input and equal to a second predetermined transconductance in response to a second control input, and the second control input is generated in response to the detection of the thermal event. In another embodiment, there is provided a disk drive having a storage medium, a read head for detecting data on the storage medium and generating a read signal, and the thermal event recovery circuit described above.

In another embodiment of the present invention, there is provided a thermal event recovery circuit for filtering a read signal from a read head in a disk drive. The circuit includes a detection circuit for detecting a thermal event that affects the read signal and a filter. The filter having a transconductance amplifier has a first predetermined transfer function in response to a first control input to the amplifier and a second predetermined transfer function in response to a second control input to the amplifier, and the second input is generated in response to the detection of the thermal event.

In yet another embodiment of the present invention, there is provided a circuit for detecting thermal interference and filtering a read signal from a read head in a disk drive. The circuit includes a detection circuit for detecting thermal interference affecting the read signal, a current source for outputting a first current or second current, and a filter. The filter includes a capacitive element, a fixed resistive element for generating a first resistance and a transconductance amplifier coupled in parallel with the fixed resistive element and having transconductance. The transconductance varies in response to the output of the current source, and the transconductance is equal to a first predetermined transconductance in response to the first current and is equal to a second predetermined transconductance in response to the second current. The second current is generated in response to the detection of the thermal interference.

In accordance with the present invention, there is also provided a method of reducing the affects of a thermal asperity on a read signal in a disk drive. A read signal is filtered with a filter having a first transfer function, the filter having a transconductance amplifier. When a thermal interference is detected in the read signal, the first transfer function of the filter is changed to a second transfer function by changing the transconductance of the amplifier. The read signal is filtered with the filter having the second transfer function. After a predetermined time period has elapsed after the detection of the thermal interference, the second transfer function of the filter is transitioned to the first transfer function.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION OF THE INVENTION

Figure 1:
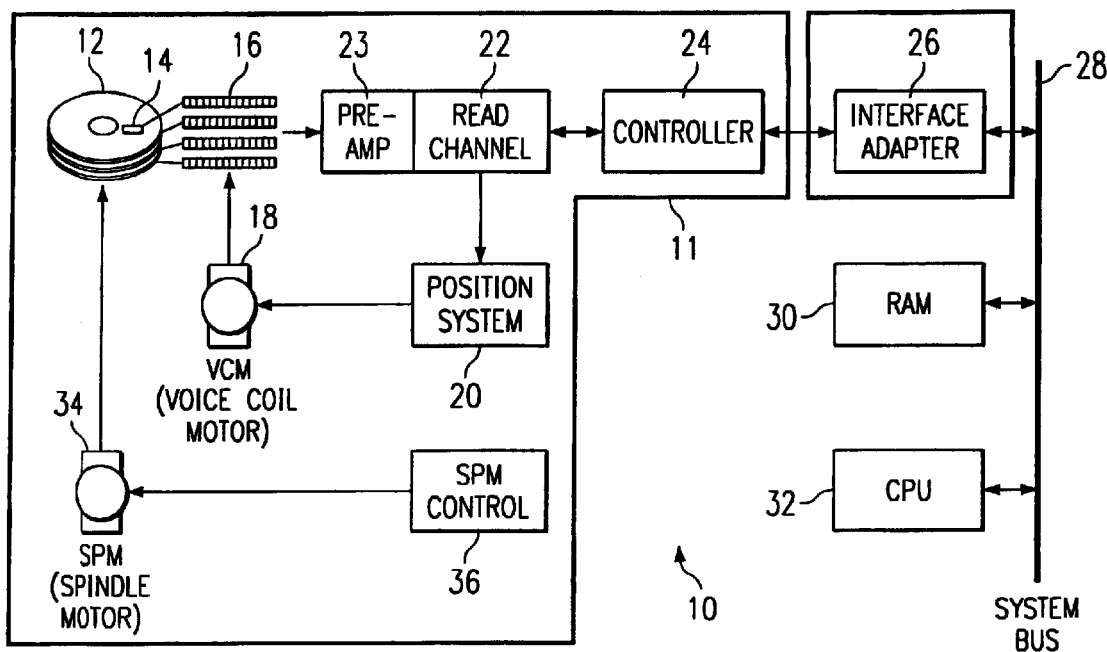
FIG. 1 is a block diagram of a computer system and a disk drive utilizing the present invention.

With reference to the drawings, like reference characters designate like or similar elements throughout the drawings.

Now referring to FIG. 1, there is shown a block diagram of a disk drive system 10 including a disk drive 11 in accordance with the present invention. The disk drive 11 includes a storage medium in the form of one or more disks 12, each of which may contain data on both sides of the disk 12. Data is stored on the disks 12 and/or read from the disks 12 by one or more read/write heads 14. The read/write head 14 is an MR head. The read/write head 14 is connected to an arm 16, with both positionally controlled by a Voice-Coil Motor ("VCM") 18 and a position system 20. The position system 20, through the VCM 18, positionally maintains/moves the head 14 radially over the desired data on the disks 12. As a signal (or signals) is input to the VCM 18, the VCM 18 moves the arm 16, thereby moving the read/write head 14.

A read channel 22, including a pre-amplifier circuit 23, detects data in analog signal form from the head 14 (the head 14 detects generates a read signal from the information stored on the disk 12) and converts the data into digital form. A controller 24 recognizes and organizes the digital data from the read channel 22 into bytes of data. An interface adapter 26 provides an interface between the controller 24 to a system bus 28 specific to the system used. Typical system buses include ISA, PCI, S-Bus, Nu-Bus, etc. The host system will also typically have other devices, such as a random access memory ("RAM") 30 and a central processing unit ("CPU") 32 attached to the bus 28. A spindle motor ("SPM") 34 and a SPM control circuit 36 rotates the disk 12 and maintains the disk 12 at the proper speed.

Thermal events occurring during the reading of data from the disk 12 cause large perturbations in the read signal resulting in the loss of data. When the perturbations are relatively short in duration, utilization of error correction coding (ECC) techniques allow for the recovery of the lost data. However, when these events last for a significant period of time, ECC cannot recover the lost data. Sometimes, a re-read of the data sector can recover the data resulting in an increase in the read time. Other times, the thermal event occurs due to the disk surface at that location, which cannot be corrected by a re-read.

Figure 2B:
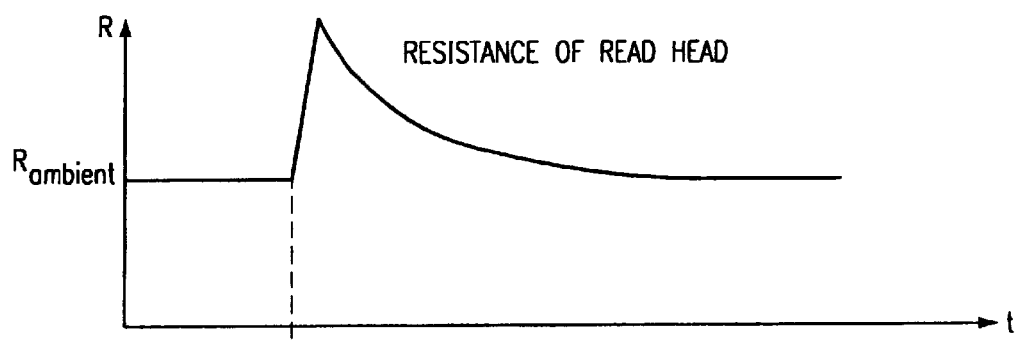
FIGS. 2A–2B are graphs illustrating an output signal from an MR head and the resistance value of the MR head before, during, and after a thermal asperity (heating event) occurs.
Figure 2A:
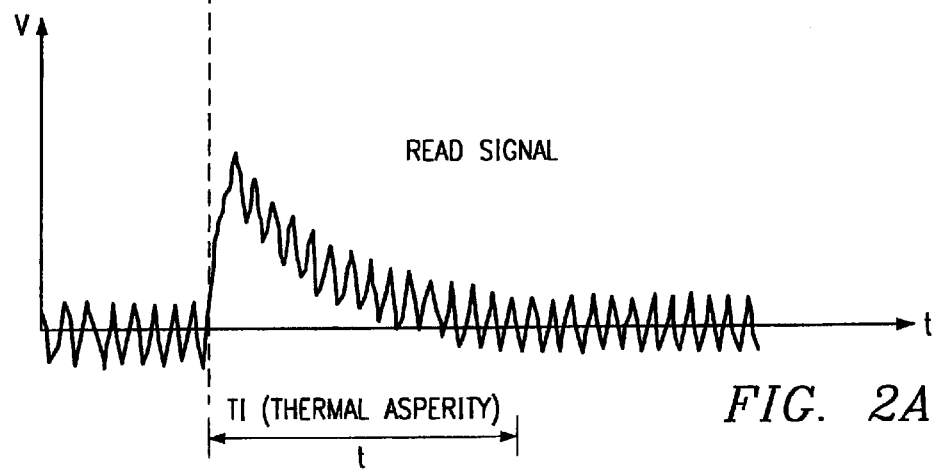

Now referring to FIGS. 2A and 2B, there are shown two graphs illustrating the output signal from an MR head and the resistance value of the MR head before, during, and after a thermal asperity (heating event) occurs. As shown, the MR head is operating under normal conditions until a time T1 when a thermal asperity (heating event) occurs. At the time T1, the resistance of the MR read head increases, as shown. The read signal increases similarly, as shown. As the thermal asperity slowly decays and the temperature of the MR head returns to normal (or ambient), the resistance and the read signal change also, as shown in FIGS. 2A and 2B. A time period t shown in FIG. 2A illustrates the decay time period for the thermal asperity, after which the data of the read signal is once again accurately read by the read channel.

The time for decay of the read signal back to normal after a thermal asperity occurs depends on several factors, including the size or magnitude of the event causing the thermal asperity, the magnitude of the temperature increase, the ambient temperature, cooling effects of the surrounding environment, etc. As will be appreciated, thermal events occurring in disk drives may be of any length and/or magnitude. Further, the thermal event may also be a cooling event, where the resistance of the MR head decreases.

It is not common for the decay of the read signal back to normal to take up to about one microsecond (and even larger, up to 2–3 microseconds). During this time period, data on the read signal may be lost. At typical data bit rates for current hard drives of about 200 Mbit/sec, about 200 bits or about 25 bytes of data (burst) may be lost due to a thermal asperity. Under typical industry standards, error correction may allow for recovery of a lost data burst of up to about 5 bytes in length, depending on the ECC techniques used. Thermal asperities are a major problem at present, and increases in data read rates further exacerbate the problem.

Figure 3:
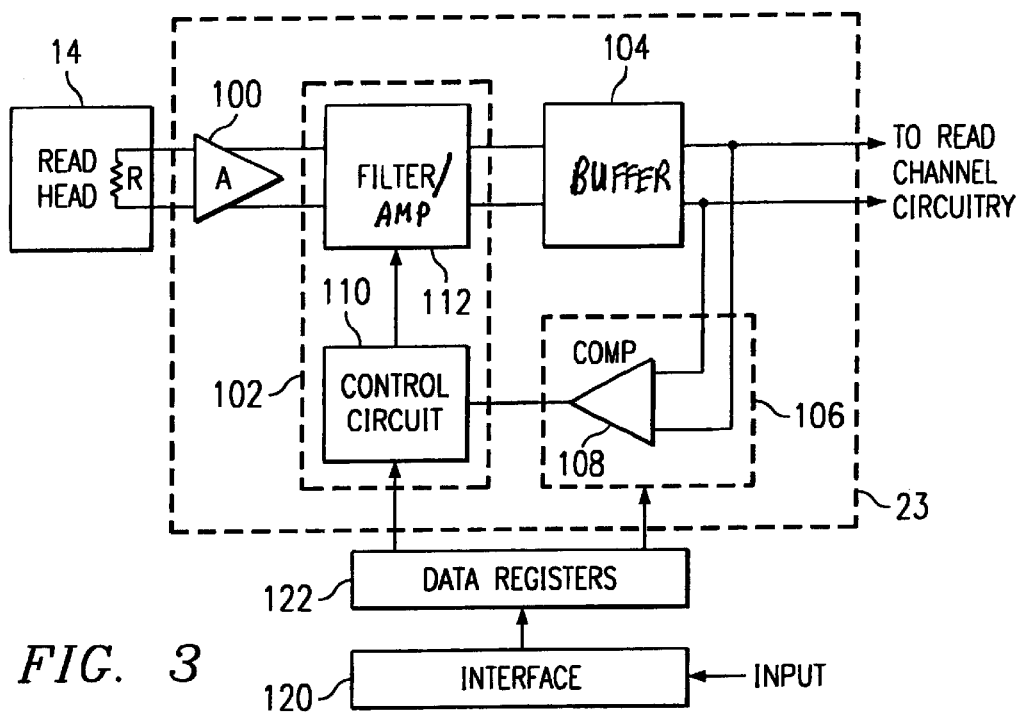
FIG. 3 is a block diagram of the read/write head and the pre-amplifier circuit shown in FIG. 1 including a filter (and additional elements) of the present invention.

Now referring to FIG. 3, there is shown a block diagram of the read/write head 14 and the pre-amplifier circuit 23 in accordance with the present invention. The read signal from the head 14 is input to an amplifier 100 of the pre-amplifier circuit 23. A thermal asperity recovery circuit 102 receives the read signal and outputs the read signal to a buffer (or amplifier) 104 (optional). The thermal asperity recovery circuit 102 includes a filter/amp 112 and a control circuit 110 for controlling the transfer characteristics (or transfer function) of the filter/amp 112. The output of the buffer 104 is input to the read channel circuitry (not shown) and input to a thermal asperity detector 106 having a differential comparator 108. When a thermal asperity is detected, a signal is generated by the detector 106 and output to the control circuit 110 for controlling the filter/amp 114.

In general operation, the thermal asperity detector 106 monitors the read signal coming from the head 14. When there is a variation of the read signal voltage above (or below, when a cooling event occurs) a predetermined threshold, the differential comparator 108 is triggered indicating a thermal asperity is detected (sometimes called a TA fault). As will be appreciated, the read signal may be a single-ended signal, and the invention described herein can be modified by those skilled in the art to operate with a single-ended signal, however, differential signals are preferred. The output of the comparator 108 is not latched, allowing a TA length monitoring circuit (not shown) to monitor the length of the thermal asperity. The predetermined threshold voltage of the comparator 108 is preferably generated by a 6-bit digital-to-analog converter (DAC)(not shown) and data registers 122, including a 6-bit data register for generating the 6-bit input to the DAC. In the preferred embodiment, the 6-bit DAC provides an output voltage generally in the range of 0 to 0.8 volts. The data registers 122 are programmed through an interface 120 (serial or parallel).

The programmability of the comparator threshold provides flexibility in selecting a threshold below (or above) which a thermal asperity having a given magnitude will not generally cause data loss (i.e., those that do not pose a problem and can be corrected by ECC, thus no detection is necessary). Additional data register bits may be used to enable/disable the detector 106 and for TA fault reporting.

Figure 4:
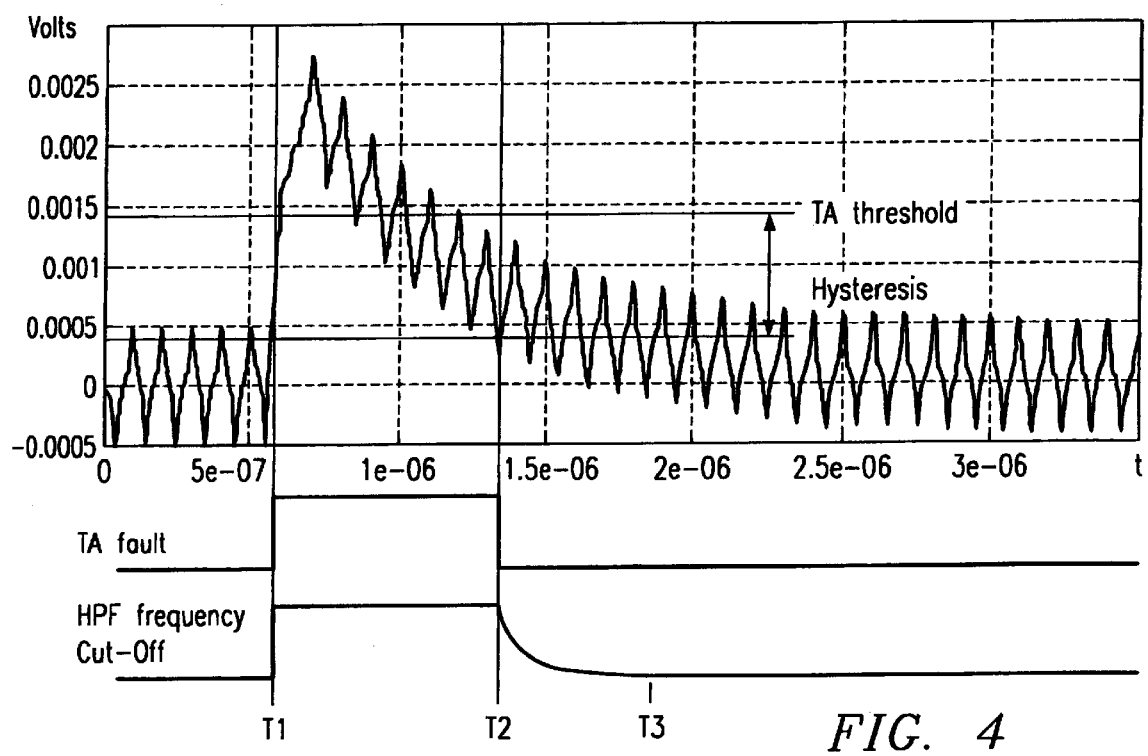
FIG. 4 illustrates a read signal with a thermal asperity and corresponding TA fault signal and cut-off frequency change for the filter.

The comparator 106 includes a hysteresis function, as illustrated in FIG. 4. As shown at T1, a thermal asperity (heating event shown) occurs and the read signal increases in amplitude and slowly returns to normal as the temperature of the MR head returns to normal (or ambient), as shown in FIG. 4. When the amplitude of the read signal rises above the TA threshold (the threshold of the comparator 108), a TA fault is detected and the control circuit 110 activates the thermal asperity recovery circuit 102 and the cutoff frequency (or transfer function) of the filter/amp 112 therein (shown in FIG. 3) is increased from an initial cutoff frequency to a predetermined higher cutoff frequency, illustrated conceptually in FIG. 4.

As the thermal asperity slowly subsides, at a time T2, the amplitude of the read signal falls below a hysteresis threshold of the comparator 106. At this time, the TA fault is no longer detected and the thermal asperity recovery circuit 102 is deactivated Deactivation results in the cutoff frequency of the filter transitioning to its initial cutoff frequency, identified at point T3. This transition (from T2 to T3) may take any form, however, including any one of the three following forms: (1) almost instantly (depending only on the physical limitations of the circuits utilized), (2) linearly (first order, i.e., substantially constant slope) over a period of time, or (3) nonlinearly (i.e., second order or higher, substantially nonconstant slope, similar to the charging/discharging curve of a capacitor) over a period of time.

If the transition from the higher cutoff frequency to the initial cutoff frequency occurs abruptly, similar to the abrupt transition from the initial cutoff frequency to the higher cutoff frequency, an offset is generated in the read signal which is generally unwanted and may cause read channel data detection problems. However, in a preferable embodiment of the present invention, the transition (linearly or nonlinearly) from the higher cutoff frequency to the initial cutoff frequency occurs relatively slowly (over a period of time), unlike the abrupt transition from the initial cutoff frequency to the higher cutoff frequency. This reduces or eliminates the offset problem. Most preferred, the transition is nonlinear. The time period for this transition can range anywhere from about 50 nanoseconds to about 1 microsecond, and even longer, and preferably is between about 200 nanoseconds and 700 nanoseconds. The circuitry and method of generating/performing the transition is described below.

Figure 5:
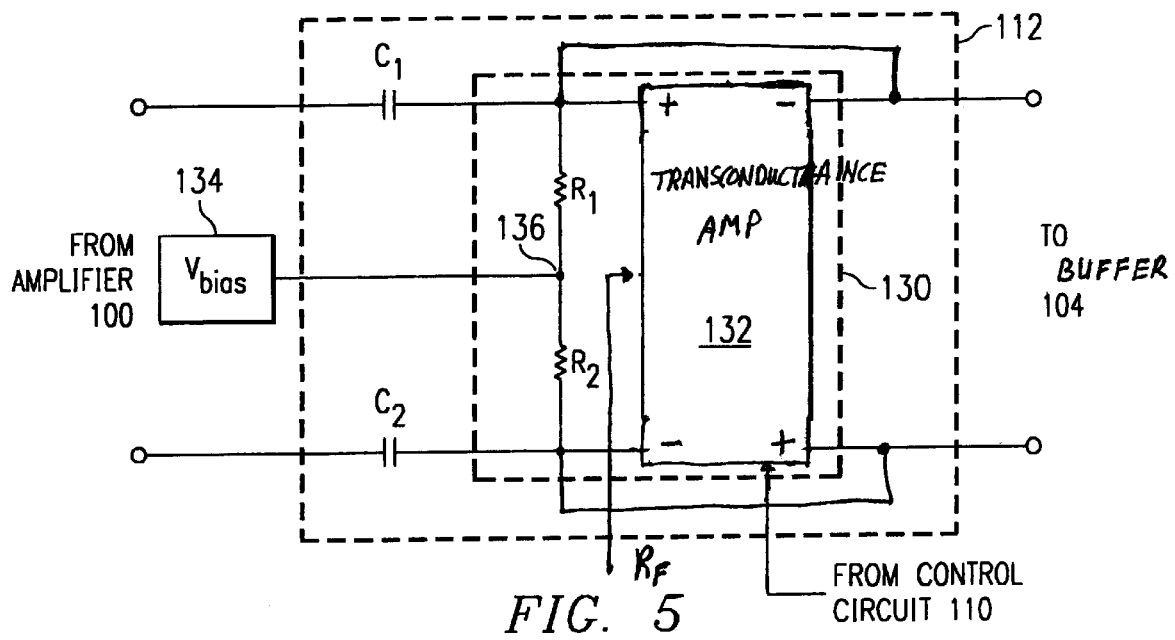
FIG. 5 is a more detailed diagram of the filter of the present invention.

Now referring to FIG. 5, there is illustrated in more detail the filter 112 of the thermal asperity recovery circuit 102, The filter/amp 112 includes a capacitor C1, a capacitor C2, and a programmable resistive element 130 including a resistor R1, a resistor R2 and a differential transconductance amplifier 132. The capacitors C1 and C2 and the resistive element 130 provide an RC-type high pass filter for the differential read signal output from the amplifier 100. As will be appreciated, a single-ended read signal could be optionally used, and the RC-type filter would be a single-ended filter. However, differential signals are preferred. It will be understood that filters other than an RC-type filter may be used for the filter/amp 112 (including second order and higher function filters), as long as the cut-off frequency varies with a change in resistance, but the preferred filter 112/114 is an RC-type high pass filter.

The resistors R1 and R2 are substantially fixed resistance resistors, and may include other devices that provide a resistance, such as transistors. In the preferred embodiment, the resistors R1 and R2 have a value of 200 Kohms and are provided by MOSFETs (not shown). A bias circuit 134 provides a voltage reference or voltage bias to the filter/amp 112 (thereby biasing the MOSFETs used for the resistors R1 and R2), as shown in FIG. 5.

The differential transconductance amplifier 132 is coupled in parallel with the resistors R1 and R2, and has a predetermined input resistance $R_F$. The transconductance of the differential amplifier 132 is $g_m$ and is related to the input resistance by the equation $R_F=1/g_m$. The transconductance of the differential amplifier is determined by input(s) from the control circuit 110. Characteristics of the RC filter are better understood with reference to a basic RC filter, therefore, the description shall utilize the capacitor C1, the resistor R1 and the transconductance of transconductance amplifier 132.

The resistor R1 and the transconductance $g_m$ of the differential amplifier 132 provides an effective resistance $R_{eff}$. The value of the capacitor C1 and the effective resistance $R_{eff}$ determines the cut-off frequency of the high pass RC filter. In the present invention, resistor R1 and the capacitor C1 are substantially fixed, therefore, as the transconductance $g_m$ of the amplifier 132 varies, so does the cut-off frequency of the filter/amp 112.

Figure 6:
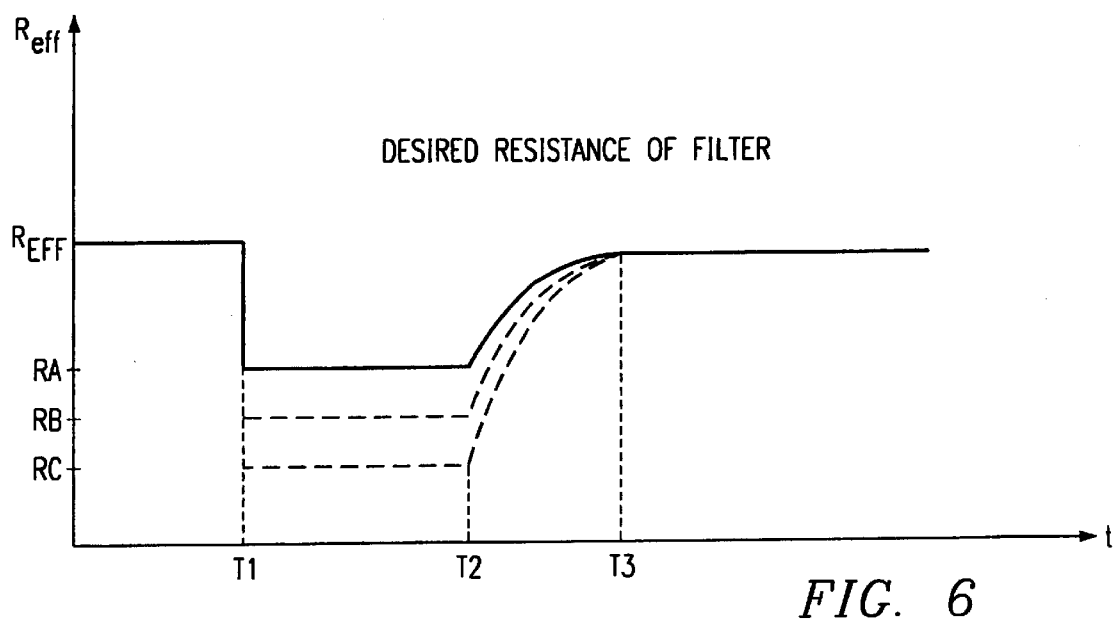
FIG. 6 is a graphical representation of the desired effective resistance $R_{eff}$ of the filter of the present invention.

Now referring to FIG. 6, there is shown a graphical representation of the desired effective resistance $R_{eff}$ of the filter/amp 112 of the thermal asperity recovery circuit 102. During normal operation of the read channel (i.e., no detected thermal interference), the effective resistance $R_{eff}$ is relatively constant at $R_{EFF}$, as shown. In the preferred embodiment, during this period of time, the transconductance of the differential amplifier 132 is a relatively low, or close to zero, resulting in a high impedance input impedance (coupled in parallel with the resistor R1). This results in the effective resistance $R_{eff}$ of the filter/amp 112 substantially equaling the resistance of the resistor R1 ($R_{EFF}$)

When a thermal asperity is detected at the time T1, the effective resistance $R_{eff}$ of the filter/amp 112 is lowered, thus raising the cut-off frequency of the filter/amp 112. The effective resistance $R_{eff}$ is lowered by programming the transconductance of the differential amplifier 132 to a predetermined transconductance in response to an input signal from the control circuit 110. For example, if the amplifier 132 is programmed to specific transconductance resulting in an input resistance $R_F$ equal 200 Kohms, the effective resistance $R_{eff}$ will be 100 Kohms (R1 in parallel with variable resistance=200K in parallel with 200K=100K).

In the preferred embodiment, the transconductance differential amplifier 132 has four programmable transconductance settings, with each setting resulting in one of four ($R_{EFF}$, RA, RB, RC) different effective resistances $R_{eff}$ for the filter/amp 112, and thus a different cut-off frequency. However, any number of programmed transconductances may be used. As will be appreciated, the programmed transconductances of the amplifier 132 are selected to achieve the cut-off frequency(s) desired for the filter/amp 112. The programmable thermal asperity recovery circuit 102 of the present invention provides flexibility thereby allowing utilization in read channels having potentially different or varying characteristics (e.g., different data rates, different causes for the thermal interference, etc.).

At the time T2, and as described earlier, the TA fault is no longer detected and the thermal asperity recovery circuit 102 is deactivated. Upon deactivation, the cutoff frequency of the filter transitions to its initial cutoff frequency, identified at point T3. In the preferred embodiment, the deactivation is accomplished by switching in the low transconductance (high impedance or open circuit) in parallel with the resistor R1, that is present in normal operation (no thermal asperity detected).

Figure 7:
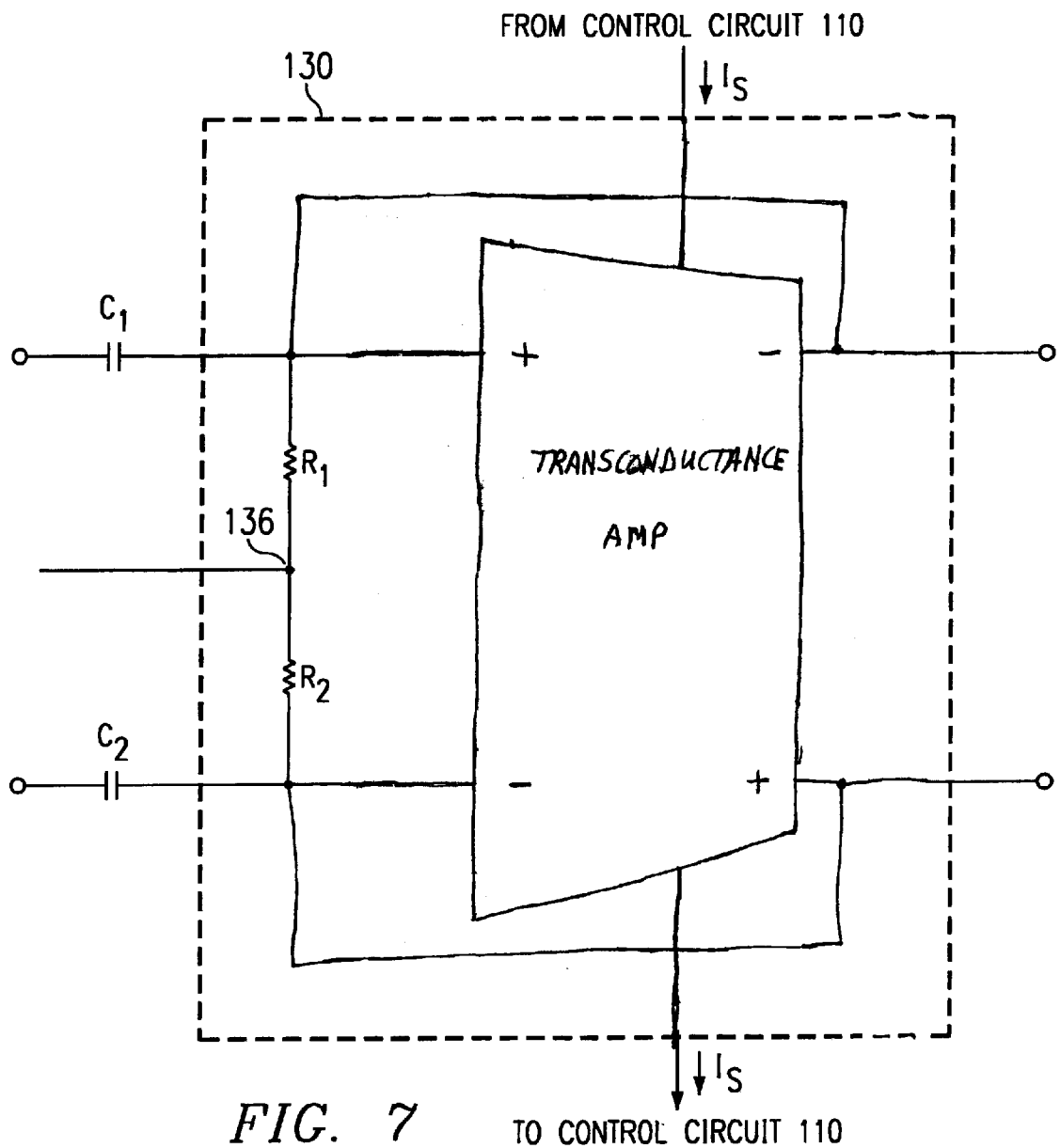
FIG. 7 is a detailed schematic diagram of the programmable resistive element or circuit shown in FIG. 5.

Now referring to FIG. 7, there is illustrated a detailed schematic diagram of the programmable resistive element or circuit 130 including the previously described resistors R1 and R2 and the programmable transconductance differential amplifier circuit 132. The overall resistance of the resistive element 130 is programmable in response to the magnitude of an input signal from the control circuit 110. In the preferred embodiment, a current $I_S$ controls the transconductance of the amplifier 132, which in turn varies the overall resistance of the resistive element 130 of the filter 112/amp.

The transconductance amplifier 132 may be constructed of any elements, preferably MOSFET or bipolar transistors. Those skilled in the art will be able to design a transconductance amplifier that can be utilized in the present invention. In the preferred embodiment, the transconductance of the amplifier 132 depends on the magnitude of a current received from the control circuit 110. When the current $I_S$ is essentially zero, the transconductance of the amplifier is low resulting in a high input impedance, and resulting in a resistance of the filter/amp 112 substantially equal to the value of fixed resistors R1 and R2. It will be understood by those skilled in the art that the characteristics of the transconductance amplifier 132 should be selected based on several factors, including the desired transconductance, i.e., input resistance of the amplifier 132 (and ultimately the resistance R for the filter/amp 112) and the magnitude of the current Is that is utilized.

Figure 8:
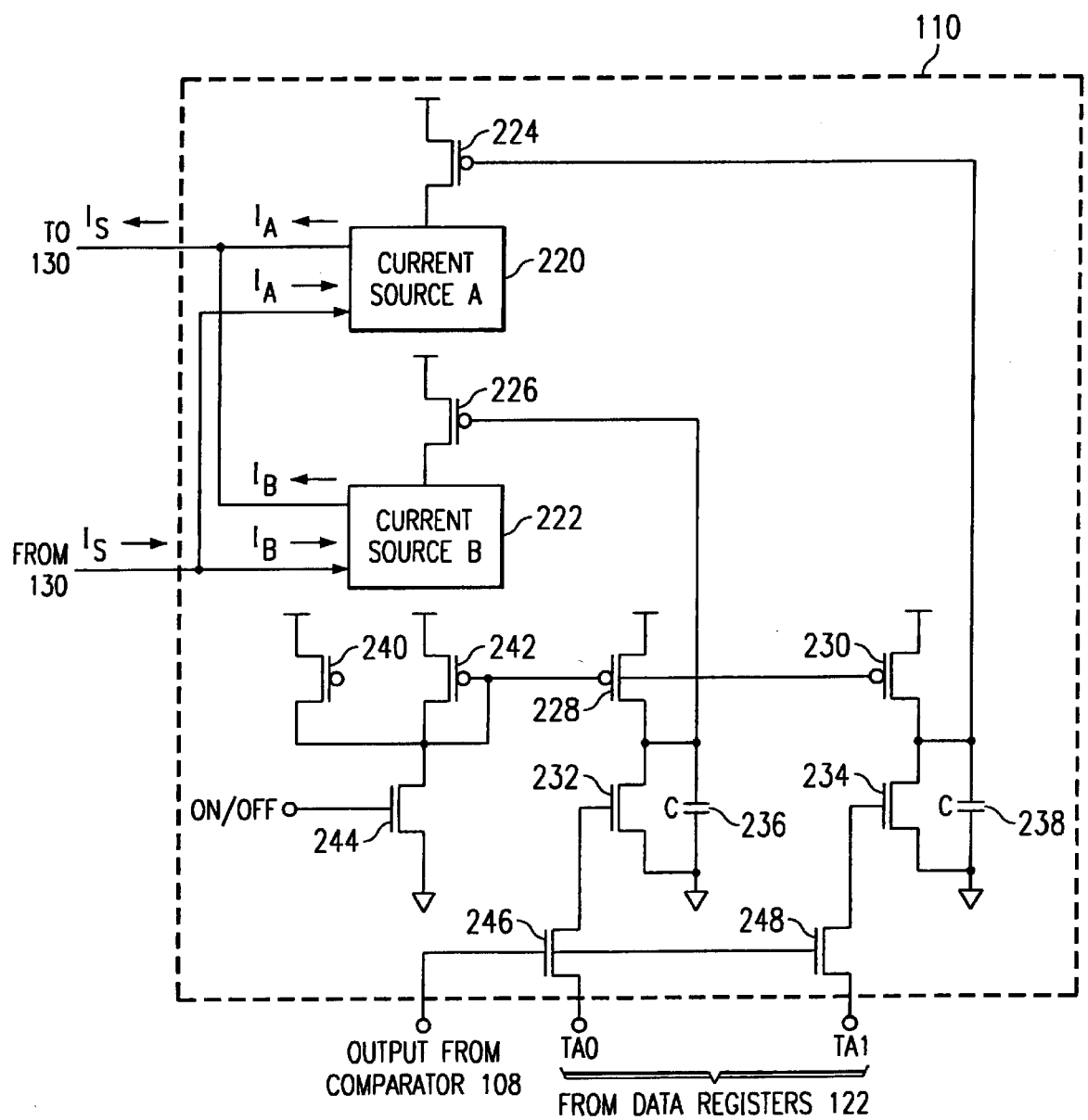
FIG. 8 is a schematic and block diagram illustrating the control circuit shown in FIG. 3 in accordance with the present invention.

Now referring to FIG. 8, there is illustrated one embodiment of the control circuit 110 for programming/setting the transconductance of the amplifier 132 (and ultimately programming/setting the cut-off frequency/transfer function of the filter/amp 112). The control circuit 110 includes a first current source (A) 220 and a second current source (B) 222. The current sources 220 and 222 provide sources of current (or reference current), and output a substantially fixed first current $I_A$ and a substantially fixed second current $I_B$, respectively. These currents are summed together to provide the current $I_S$ input to transconductance amplifier 132 (see FIG. 7). Accordingly, the current source A 220 and the current source B 222 provide a programmable current source outputting the programmable current $I_S$. In the preferred embodiment, the current $I_S$ equals zero, $I_A$, $I_B$, or $I_A+I_B$. As will be appreciated, additional current sources, such as C, D, E, etc. could be used to increase the programmability.

Operation of the control circuit 110 is enabled/disabled by operation of the transistors 240, 242, 244 and an enable/disable signal. The enable/disable signal may be generated by additional control circuitry (not shown), as desired.

The general on/off operation of the current source A 220 is controlled by transistors 224, 230, 234, and a signal TA1 output from the data registers 122, as shown. When the signal TA1 equals a logic one, the current source A 220 is turned off and no current is output. When the signal TA1 equals a logic zero, the current source A 220 is turned on and outputs current $I_A$. Similarly, the general on/off operation of the current source B 222 is controlled by transistors 226, 232, 236, and a signal TA0 output from the data registers 122, as shown. When the signal TA0 equals a logic one, the current source B 222 is turned off and no current is output. When the signal TA0 equals a logic zero, the current source B 222 is turned on and outputs current $I_B$. Two transistors 246, 248 provide an enable/disable function based upon the detection of a thermal asperity output from the comparator 108. As will be appreciated, this function may be integrated with the output of the TA registers producing the signals TA0 and TA1.

In the preferred embodiment, the current $I_S=0$, when no thermal asperity is detected by the comparator 108, or when TA1=logic zero and TA0=logic zero. The current $I_S=I_B$, when TA1=logic zero and TA0=logic one. The current $I_S=I_A$, when TA1=logic one and TA0=logic zero. The current $I_S=I_B+I_A$, when TA1=logic one and TA0=logic one. Also, in the preferred embodiment, the current source A 220 outputs 20 microamperes and the current source B 222 outputs 10 microamperes. Therefore, the current $I_S$ is programmable to four levels: zero, 10, 20 or 30 microamps. Because the transconductance of the amplifier 132 varies with the amount of current flowing therethrough, the input resistance $R_F$ of the amplifier 132, and hence the cut-off frequency (transfer function) of the filter/amp 112, varies and is programmable in response to the programmable current source (current sources 220, 222). Accordingly, for different values of current $I_S$, the cut-off frequency (transfer function) of the filter/amp 112 is different.

In the preferred embodiment, and under current industry specifications, the initial cutoff frequency (under normal operating conditions when no thermal asperity is detected) is around 500 KHz, and the cutoff frequency is programmable in the range between 500 KHz and 20 MHz. As data rates go higher, the programmable cut-off frequencies may also need to go higher. It will be understood that the factors influencing the desired cut-off frequency (based on the value of resistance) of the filter/amp 112 include the programmable values of the current $I_S$ and the design of the transconductance amplifier 132.

Now referring back to FIGS. 4 and 6, the realization of the transition of the cut-off frequency (FIG. 4) and the resistance of the filter (FIG. 6) between time T2 and T3 will now be explained. Referring to FIG. 8, the general on/off operation of the current sources 220, 222 was explained above. Additional circuitry is added to achieve the slower transition, as described earlier herein, from the programmed cut-off frequency (transfer function) to the initial cut-off frequency (or from the programmed resistance to the initial resistance). The additional circuitry is in the form of a capacitor 236 coupled to ground and to the S/D of the transistor 232 and a capacitor coupled to ground and coupled to the S/D of the transistor 234. The capacitors 238, 236 are utilized to slowly turn off the p-channel transistors 224, 226 coupling power to the current sources 220, 222, respectively.

Assuming a thermal asperity is detected and the current sources 220, 222 are turned on, when the thermal asperity is no longer detected, the signals at the gates of the transistors 232, 234 are logic zero (or floating), thereby turning off the transistors 232, 234. The transistors 228, 230 then provide a current to charge the capacitors 236, 238, respectively, to a logic one, thus slowly turning off the current sources 220, 222. Without the capacitors 236, 238, the signal at the gates of the transistors 224, 226 would rise abruptly to a logic one, thereby quickly shutting off the current sources 220, 222. Different values for the capacitors 236, 238 (as well as additional circuitry, for example, resistors, like resistors) may be used to shape the transition (change in resistance/transconductance of the filter/amp 112 and change in cut-off frequency (transfer function)) between the time T2 and T3, as desired. In the preferred embodiment, the capacitors 236, 238 have a value of about two picofarads. The transition as described helps eliminate or reduce unwanted offset and ringing problems.

The general operation of the present invention will now be described. Under normal operating conditions, i.e., when no thermal asperity is detected (a thermal asperity may be present but undetected or not relevant because of its magnitude/size), the filter/amp 112 provides a high pass filtering function operating at a first cut-off frequency (transfer function) for the readback signal from the read head 14. The first cut-off frequency is determined by setting or programming the transconductance of the amplifier 132 in the filter/amp 112 resulting in a predetermined input resistance value and resistance value of the filter/amp 112. The transconductance (and ultimately the magnitude of resistance) is set or programmed in response to a first input to a programmable current source. The first input initiates a first predetermined amount of current from the programmable current source and the transconductance (and ultimately resistance) is dependent on the magnitude of the current flowing.

Upon detection of a relevant thermal asperity upon exceeding a predetermined threshold, a second input causes the programmable current source to output a different, predetermined amount of current. This changes the characteristics of the transconductance amplifier 132 and the resistance in the filter/amp 112, and results in a different, second cut-off frequency (transfer function) for the filter/amp 112. The filter/amp 112 has been programmed to have a different transfer function which is utilized to eliminate or reduce the effects of the thermal asperity by filtering the readback signal. In response to thermal interference detection, the filter/amp 112 provides a high pass filtering function operating at a second first cut-off frequency (transfer function) for the readback signal from the read head 14. In the preferred embodiment, the second cut-off frequency is higher than the first cut-off frequency of the filter/amp 112.

Different amounts of current are programmable based on different inputs to the programmable current source. Therefore, the cut-off frequency of the filter/amp 112 can be set or programmed to have one of a multitude of possible cut-off frequencies.

When the magnitude of the relevant thermal asperity decreases and the read signal transitions back across the predetermined threshold (TA fault no longer detected), the current source is programmed to the first amount of current thereby programming the cut-off frequency (transfer function) of the filter/amp 112 back to first cut-off frequency. The filter/amp 112 then again provides a high pass filtering function operating at the first cut-off frequency (transfer function) for the readback signal from the read head 14.

Another feature of the present invention operates to slowly (relatively slowly) transition the cut-off frequency (transfer function) of the filter/amp 112 from the second cut-off frequency back to the first cut-off frequency (by slowly transitioning the resistance of the variable resistance circuit 132), see FIGS. 4 and 6. Circuitry is utilized to create a relatively slow and predictable control signal (voltage) to the programmable current source to slowly change the amount of current output therefrom. In the preferred embodiment, a capacitor provides this function.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A thermal event recovery circuit for filtering a read signal from a read head in a disk drive, the circuit comprising:

a detection circuit for detecting a thermal event affecting the read signal; and a filter comprising a transconductance amplifier having a transconductance that varies in response to a control input, the transconductance equal to a first predetermined transconductance in response to a first control input and equal to a second predetermined transconductance in response to a second control input, the second control input generated in response to the detection of the thermal event.

2. The circuit in accordance with claim 1 wherein the filter is a high-pass filter and the filter comprises a capacitive element, a fixed resistance element, and the transconductance amplifier coupled in parallel with the fixed resistance element.

3. The circuit in accordance with claim 1 wherein the transconductance of the amplifier equals a third predetermined transconductance in response to a third control input and the second control input or the third control input is generated in response to the detection of the thermal event.

4. The circuit in accordance with claim 3 wherein the control input is in the form of a current output from a current source, and the first control input comprises the current having a first magnitude, the second control input comprises the current having a second magnitude, and the third control input comprises the current having a third magnitude.

5. The circuit in accordance with claim 1 further comprising a current source outputting a first current in response to the first control input and outputting a second current in response to the second control input, wherein the first predetermined transconductance is generated in response to the first current and the second predetermined transconductance is generated in response to the second current.

6. The circuit in accordance with claim 5 wherein the transconductance of the transconductance amplifier equals a third predetermined transconductance in response to a third control input, the current source outputs a third current in response to the third control input and the third predetermined transconductance is generated in response to the third current, and the second control input or the third control input is generated in response to the detection of the thermal event.

7. The circuit in accordance with claim 1 wherein the first and second predetermined transconductances are controlled using a current.

8. The circuit in accordance with claim 1 wherein the transconductance of the transconductance amplifier slowly transitions during a transition period from the second predetermined transconductance to the first predetermined transconductance after the thermal event is no longer detected.

9. The circuit in accordance with claim 8 wherein the transition period is greater than about 50 nanoseconds.

10. The circuit in accordance with claim 8 wherein the transition follows a transition curve and the transition period is greater than about 50 nanoseconds.

11. The circuit in accordance with claim 10 wherein the transition curve is nonlinear.

12. The circuit in accordance with claim 1 further comprising transition circuitry for transitioning during a transition period the transconductance of the transconductance amplifier from the first predetermined transconductance to the second predetermined transconductance after the thermal event is no longer detected.

13. A thermal event recovery circuit for filtering a read signal from a read head in a disk drive, the circuit comprising:

a detection circuit for detecting a thermal event affecting the read signal; and a filter comprising a transconductance amplifier, the filter having a first predetermined transfer function in response to a first control input to the transconductance amplifier, and having a second predetermined transfer function in response to a second control input to the transconductance amplifier, the second input generated in response to the detection of the thermal event.

14. The circuit in accordance with claim 13 wherein the filter is a high-pass filter and the filter comprises a capacitive element and a fixed resistive element, with the transconductance amplifier coupled in parallel with the fixed resistive element.

15. The circuit in accordance with claim 14 wherein the filter has a third predetermined transfer function in response to a third control input to the transconductance amplifier, and the second input or the third input is generated in response to the detection of the thermal event.

16. The circuit in accordance with claim 14 wherein the transfer function of the filter slowly transitions during a transition period from the second transfer function to the first transfer function after the thermal event is no longer detected.

17. The circuit in accordance with claim 16 wherein the transition period is greater than about 50 nanoseconds.

18. A circuit for detecting thermal interference and filtering a read signal from a read head in a disk drive, the circuit comprising:
  a detection circuit for detecting thermal interference affecting the read signal;
  a current source for outputting a first current or second current; and
  a filter comprising,
    a capacitive element,
    a fixed resistive element generating a first resistance, and
    a transconductance amplifier coupled in parallel with the fixed resistive element and having a transconductance that varies in response to the output of the current source, the transconductance equal to a first predetermined transconductance in response to the first current and equal to a second predetermined transconductance in response to the second current, the second current generated in response to the detection of the thermal interference.

19. The circuit in accordance with claim 18 wherein the current source outputs a third current and the transconductance equals a third predetermined transconductance in response to the third current, the second current or the third current generated in response to the detection of the thermal event.

20. The circuit in accordance with claim 18 wherein the transconductance of the transconductance amplifier slowly transitions during a transition period from the second predetermined transconductance to the first predetermined transconductance after the thermal event is no longer detected.

21. The circuit in accordance with claim 20 wherein the transition period is greater than about 50 nanoseconds.

22. A disk drive comprising:
  a storage medium,
  a read head for detecting data on the storage medium and generating a read signal;
  a detection circuit for detecting a thermal event affecting the read signal; and
  a filter comprising a capacitive element and a resistive element, the resistive element comprising a fixed resistive element and a transconductance amplifier coupled in parallel with the fixed resistive element, the transconductance amplifier having a transconductance that varies in response to a control input, the transconductance equal to a first predetermined transconductance in response to a first control input and equal to a second predetermined transconductance in response to a second control input, the second control input generated in response to the detection of the thermal event.

23. The circuit in accordance with claim 22 wherein the transconductance of the transconductance amplifier equals a third predetermined transconductance in response to a third control input and the second control input or the third control input is generated in response to the detection of the thermal event.

24. The circuit in accordance with claim 22 further comprising a current source outputting a first current in response to the first control input and outputting a second current in response to the second control input, wherein the first predetermined transconductance is generated in response to the first current and the second predetermined transconductance is generated in response to the second current.

25. The circuit in accordance with claim 22 wherein the transconductance of the transconductance amplifier slowly transitions during a transition period from the second predetermined transconductance to the first predetermined transconductance after the thermal event is no longer detected.

26. A method of reducing the affects of a thermal asperity on a read signal in a disk drive, comprising the steps of:
  filtering the read signal with a filter having a first transfer function, the filter comprising a transconductance amplifier;
  detecting thermal interference in the read signal;
  changing, in response to the detection of the thermal interference, the first transfer function of the filter to a second transfer function by changing the transconductance of the amplifier;
  filtering the signal with the filter having the second transfer function; and
  transitioning, after a predetermined time period has elapsed after the detection of the thermal interference, the second transfer function of the filter to the first transfer function.

27. The method in accordance with claim 26 wherein the first transfer function comprises substantially a high pass transfer function having a first cut-off frequency and the second transfer function comprises substantially a high pass transfer function having a second cut-off frequency.

28. The method in accordance with claim 26 further comprising the step of selecting one of a plurality of transfer functions as the second transfer function.

29. The method in accordance with claim 25 wherein the step of transitioning the second transfer function of the filter to the first transfer function occurs over a transition period greater than about 50 nanoseconds.

30. A thermal event recovery circuit for filtering a read signal from a read head in a disk drive, the circuit comprising:
  a detection circuit for detecting a thermal event affecting the read signal; and
  a filter comprising a transconductance amplifier having a transconductance that varies in response to a control signal having a first state and a second state, the transconductance equal to a first predetermined transconductance in response to the first state and equal to a second predetermined transconductance in response to the second state, the second state generated in response to the detection of the thermal event.

31. A thermal event recovery circuit for filtering a read signal from a read head in a disk drive, the circuit comprising:

a detection circuit for detecting a thermal event affecting the read signal; and a filter comprising a transconductance amplifier, the filter having a first predetermined transfer function in response to a control signal having a first state, and having a second predetermined transfer function in response to the control signal having a second state, the second state generated in response to the detection of the thermal event.

32. A disk drive comprising:

a storage medium, a read head for detecting data on the storage medium and generating a read signal;

a detection circuit for detecting a thermal event affecting the read signal; and a filter comprising a capacitive element and a resistive element, the resistive element comprising a fixed resistive element and a transconductance amplifier coupled in parallel with the fixed resistive element, the transconductance amplifier having a transconductance that varies in response to a control signal having a first state and a second state, the transconductance equal to a first predetermined transconductance in response to the first state and equal to a second predetermined transconductance in response to the second state, the second state generated in response to the detection of the thermal event.

* * * * *